(12) United States Patent
Maeda

(10) Patent No.: US 6,578,796 B2
(45) Date of Patent: Jun. 17, 2003

(54) LIQUID DROPPING APPARATUS FOR HELICOPTER

(75) Inventor: Iwao Maeda, Kobe (JP)

(73) Assignee: Shinmaywa Industries, Ltd., Hyogo (JP)

( * ) Notice: Subject to any disclaimer, the term of this patent is extended or adjusted under 35 U.S.C. 154(b) by 0 days.

(21) Appl. No.: 10/015,084

(22) Filed: Dec. 11, 2001

(65) Prior Publication Data

US 2002/0084383 A1 Jul. 4, 2002

(30) Foreign Application Priority Data

Dec. 11, 2000 (JP) ..................... 2000-375721

(51) Int. Cl.⁷ ............................... B64D 1/16
(52) U.S. Cl. ..................... 244/136; 244/17.11
(58) Field of Search .............. 244/136, 17.11; 239/171; 169/53

(56) References Cited

U.S. PATENT DOCUMENTS

| | | | | |
|---|---|---|---|---|
| 3,901,467 A | * | 8/1975 | Hawkshaw | 244/136 |
| 4,804,157 A | * | 2/1989 | Muscatell | 244/135 R |
| 4,826,109 A | * | 5/1989 | Camus | 244/137.4 |
| 5,135,055 A | * | 8/1992 | Bisson | 169/53 |
| 6,003,782 A | * | 12/1999 | Kim et al. | 239/171 |
| 6,209,593 B1 | * | 4/2001 | Nichols, Sr. | 141/231 |

FOREIGN PATENT DOCUMENTS

| | | | | |
|---|---|---|---|---|
| CA | 975733 | * | 10/1975 | 244/104 |
| JP | 10-273097 | | 10/1998 | |

* cited by examiner

Primary Examiner—Peter M. Poon
Assistant Examiner—Timothy D. Collins
(74) Attorney, Agent, or Firm—Marshall, Gerstein & Borun

(57) ABSTRACT

A liquid dropping apparatus for a helicopter includes a tank for containing a liquid therein for attachment below a helicopter body. The tank has a lower surface with a concave portion formed by concaving a wall portion and has a liquid discharge port opened on a side surface of the concave portion. A door is provided on a bottom surface of the concave portion of the tank to pivotally swing around a side thereof closer to the bottom surface of the concave portion, thereby freely opening and closing the liquid discharge port. Drivers are provided for driving the door to open and close.

15 Claims, 10 Drawing Sheets

LIQUID DROPPING APPARATUS FOR HELICOPTER

BACKGROUND OF THE INVENTION

1. Field of the Invention

The present invention relates to a liquid dropping apparatus for a helicopter.

2. Description of the Related Art

FIG. 9 is a sectional view typically showing the structure of a liquid dropping apparatus for a helicopter according to a first conventional example.

In FIG. 9, a liquid dropping apparatus 1 for a helicopter according to the first conventional example is used for dropping water for fire fighting from a helicopter. The liquid dropping apparatus 1 has such a structure that a liquid discharge port 7 is opened on the lower surface of a water tank (hereinafter referred to as a tank) 2 attached to the lower surface of a body 4 of a helicopter 3, a dropping door 8 for opening and closing the liquid discharge port 7 by pivotally swinging around an edge portion side thereof is provided on the edge portion of the liquid discharge port 7, and the dropping door 8 is opened and closed by a torque shaft 13, a bell link 12 and a link 9 which are coupled to a driving source (not shown).

When the dropping door 8 is opened in the air in a state in which the liquid dropping apparatus 1 having such a structure is attached to the helicopter 3 and the tank 2 is filled with the water for fire fighting, the water in the tank 2 is dropped downward from the liquid discharge port 7 as shown in an arrow, thereby the fire fighting is carried out.

FIG. 10 is a sectional view typically showing the structure of a liquid dropping apparatus for a helicopter according to a second conventional example.

In FIG. 10, the liquid dropping apparatus 1 for a helicopter according to the second conventional example is constituted such that a dropping door 8 is opened and closed by parallelogrammatic links 61 and 62 differently from the first conventional example. Other points are the same as those in the first conventional example. The reference numerals 63 and 64 denote a torque shaft coupled to a driving source.

In the first and second conventional examples, a clearance formed between the lower surface of the body 4 and a ground 6 with the helicopter 3 present on the ground, that is, a ground clearance G is generally small, for example, approximately 50 cm. On the other hand, the water tank 2 has a capacity of approximately 500 to 1000 liters. Accordingly, the thickness of the tank 2 is greatly increased. In the first conventional example, therefore, the tip of the door 8 interferes with the ground 6 in a state in which the helicopter 3 is present on the ground. Therefore, the door 8 is not opened. The function of opening and closing the dropping door 8 on the ground is important for inspecting an operation before a flight and discharging the water from the tank. First of all, the helicopter 3 having the tank 2 which does not have such a function performs a duty thereof without the confirmation of a prior operation. As a result, there is a possibility that a duty achievement rate might be decreased. Secondly, in the case in which the water is discharged from the tank 2, the water should be discharged by connecting a drainage pump to the water supply port of the tank 2. Consequently, extra ground equipment is required.

In the second conventional example, as shown in FIG. 10, the door 8 is opened and closed by the parallelogrammatic links 61 and 62. Therefore, when the door 8 is to be opened, it is moved in a transverse direction along the lower surface of the tank 2. Consequently, even if the ground clearance G is small, the door 8 can be opened and closed on the ground. For this reason, the problems in the first conventional example do not arise.

However, in the case in which such parallelogrammatic links 61 and 62 are employed, the complicated mechanism causes an increase in the weight of the liquid dropping apparatus 1 and a deterioration in the reliability of a mechanism for opening and closing the door 8, which is not preferable for an airplane.

As another conventional example, moreover, the width of a liquid discharge port is reduced to decrease the swing radius of a door so that the door can be opened and closed on the ground. In such an example, the area of the liquid discharge port is reduced. Therefore, water for fire fighting cannot be dropped rapidly. In this case, a large number of liquid discharge ports are provided such that the water for fire fighting can be dropped rapidly. However, when the water for fire fighting is dropped from the liquid discharge ports, the water for fire fighting thus dropped is dispersed and changed into a mist so that the water for fire fighting is intensively dropped with difficulty. For this reason, a thickener is mixed in the water for fire fighting.

Japanese Laid-Open Patent Publication No. Hei 10-273097 (1998/273097) has disclosed a liquid dropping apparatus for a helicopter which can intensively drop water for fire fighting. The liquid dropping apparatus for a helicopter has such a structure that a tank is attached to both sides of the body of a helicopter and a liquid discharge duct of a movable type is positioned on the lower side of the body, and requires a driving mechanism for the liquid discharge duct. Correspondingly, a weight is increased and the tank is provided on the side of the body of the helicopter. Consequently, there is a problem in that the capacity of the tank cannot be increased.

SUMMARY OF THE INVENTION

In order to solve the problems, it is a first object of the present invention to provide a liquid dropping apparatus for a helicopter which is attached to the lower part of the body of a helicopter and can open and close a door in spite of a small ground clearance without increasing a weight and deteriorating the reliability of a door opening and closing mechanism.

Moreover, it is a second object of the present invention to provide a liquid dropping apparatus for a helicopter which is attached to the lower part of the body of a helicopter and can rapidly and intensively drop a liquid in a tank and can open and close a door in spite of a small ground clearance.

In order to attain the objects, the present invention provides a liquid dropping apparatus for a helicopter comprising: a tank for putting a liquid therein which is attached to a body of a helicopter to be positioned below the body, is provided with a lower surface having a concave portion formed by concaving a wall portion and has a liquid discharge port opened on a side surface of the concave portion; a door provided on a bottom surface of the concave portion of the tank to pivotally swing around a side thereof closer to the bottom surface of the concave portion, thereby freely opening and closing the liquid discharge port; and a door opening and closing means for driving the door to open and close. According to such a structure, the fulcrum as to swinging of the dropping door is raised by the depth of the concave portion. Therefore, it is possible to open and close the door of a swing type so as not to interfere with the ground in spite of a smaller ground clearance corresponding to the rise in the fulcrum. Moreover, the door of the swing type has a simple structure. For this reason, it is possible to prevent an increase in a weight and a deterioration in the reliability of the opening and closing mechanism.

In this case, the liquid discharge ports may be opened in positions of side surfaces of the concave portion which are opposed to each other as seen from above and are placed on substantially the same level; and the door may be provided in each of the liquid discharge ports. According to such a structure, the liquids discharged from the two liquid discharge ports are dropped and converge on one stream. Therefore, the change of the dropped liquid into a mist can be reduced. As a result, the liquid in the tank can be dropped intensively and a thickener is not required.

In this case, a portion of the side surface of the concave portion in which the liquid discharge port is opened may be inclined inward in the concave portion. According to such a structure, the liquids are discharged from the two liquid discharge ports obliquely downward. Therefore, it is possible to quickly discharge the liquid in the tank.

In this case, the concave portion may be formed to extend in a direction in which the body of the helicopter extends when the tank is attached to the body and the liquid discharge ports may be opened on both side surfaces in a direction in which the concave portion extends. According to such a structure, when the tank is to be attached to the helicopter for use, the liquid in the tank is discharged in a perpendicular direction to the direction of the advance of the helicopter. Therefore, the liquids discharged from the two liquid discharge ports can meet each other without the influence of the movement of the helicopter.

In this case, the tank may be formed almost symmetrically with a vertical plane extending in the direction in which the concave portion extends. According to such a structure, it is possible to prevent the stability of the helicopter from being damaged by that the tank is attached in a transverse imbalanced state.

In the above-mentioned case, moreover, a pair of convex portions may be formed on an upper surface of the tank by bulging a wall portion and may be provided such that the body of the helicopter is positioned between the convex portions when the tank is attached to the body. According to such a structure, the capacity of the tank is increased corresponding to the convex portion. Therefore, it is possible to prevent the capacity of the tank from being decreased due to the provision of the concave portion. In addition, since the water head of the liquid in the tank is increased, the liquid in the tank can be dropped rapidly.

In the above-mentioned case, furthermore, a pair of convex portions may be formed on an upper surface of the tank by bulging a wall portion and may be provided such that the body of the helicopter is positioned between the convex portions and may be almost symmetrical with the vertical plane when the tank is attached to the body. According to such a structure, the stability of the helicopter can be prevented from being damaged by that the tank is attached in a transverse imbalanced state. In addition, it is possible to prevent the capacity of the tank from being decreased due to the provision of the concave portion and it is possible to rapidly drop the liquid in the tank.

In this case, a vertical section of the concave portion in the direction perpendicular to a direction in which the concave portion extends may be formed to be substantially trapezoidal, the liquid discharge ports may be opened over substantially whole both side surfaces in the direction in which the concave portion extends respectively, an inclination of the side surfaces to a horizontal plane may be approximately 30 degrees and a width of each of the side surfaces may be substantially equal to that of a bottom surface of the concave portion. According to such a structure, the liquid in the tank can be dropped almost most rapidly.

In the above-mentioned case, the tank may be removable from the body of the helicopter. According to such a structure, the helicopter can be used for many purposes.

In the above-mentioned case, moreover, the tank may be removable from the body of the helicopter and at least one of the convex portions may be removable from other portions of the tank. According to such a structure, it can be done that one of the convex portions is removed and the tank is inserted below the body of the helicopter in a transverse direction and is attached to the body, and the convex portion thus removed is then attached to the tank. Consequently, even if the tank has the convex portion, it can be easily attached to the body.

These objects as well as other objects, features and advantages of the present invention will become more apparent to those skilled in the art from the following description with reference to the accompanying drawings.

DESCRIPTION OF THE PREFERRED EMBODIMENTS

An embodiment of the present invention will be described below with reference to the drawings.

Embodiment

Figure 1:
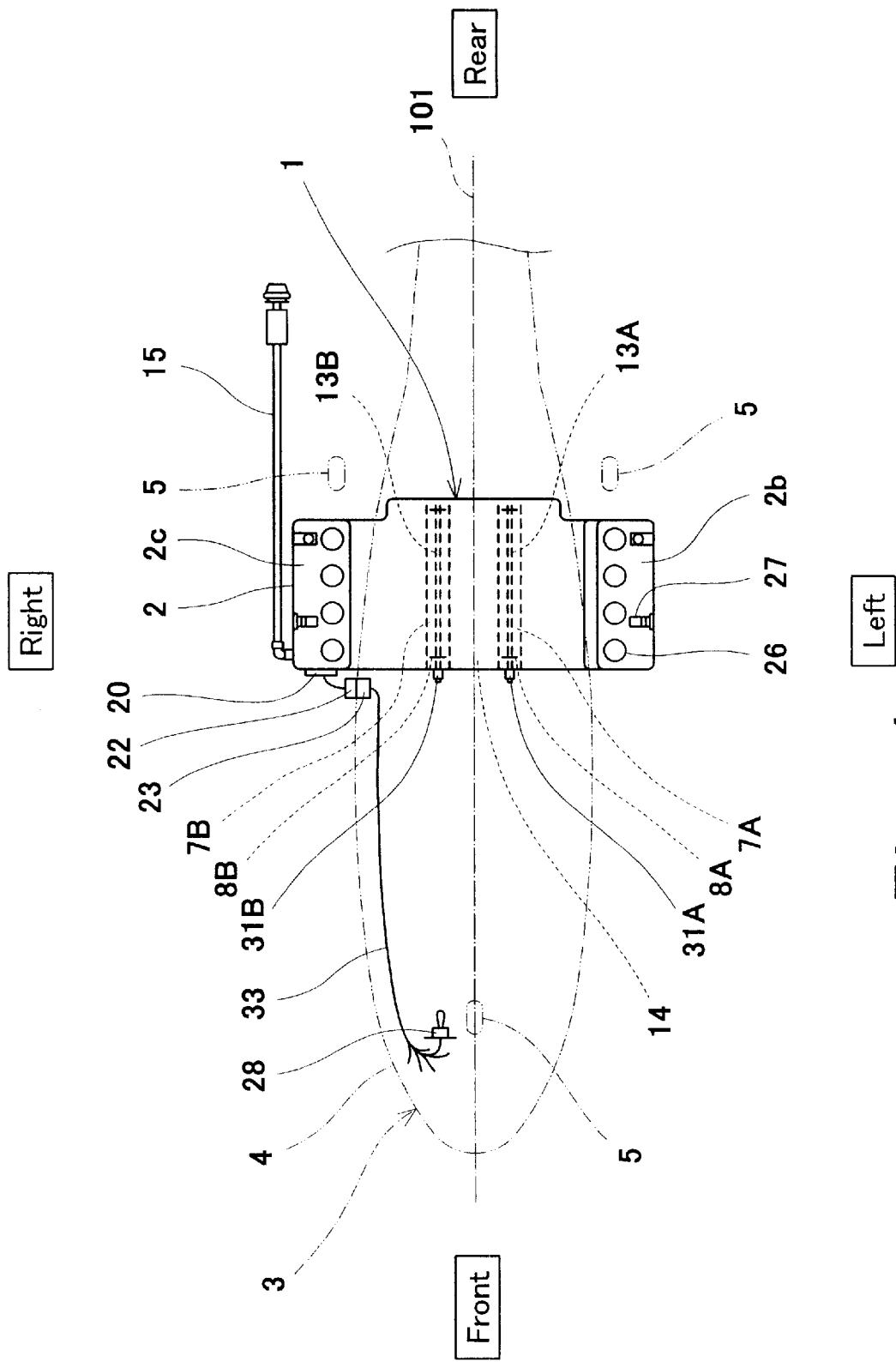
FIG. 1 is a plan view showing the schematic structure of a liquid dropping apparatus for a helicopter according to an embodiment of the present invention.
Figure 2:
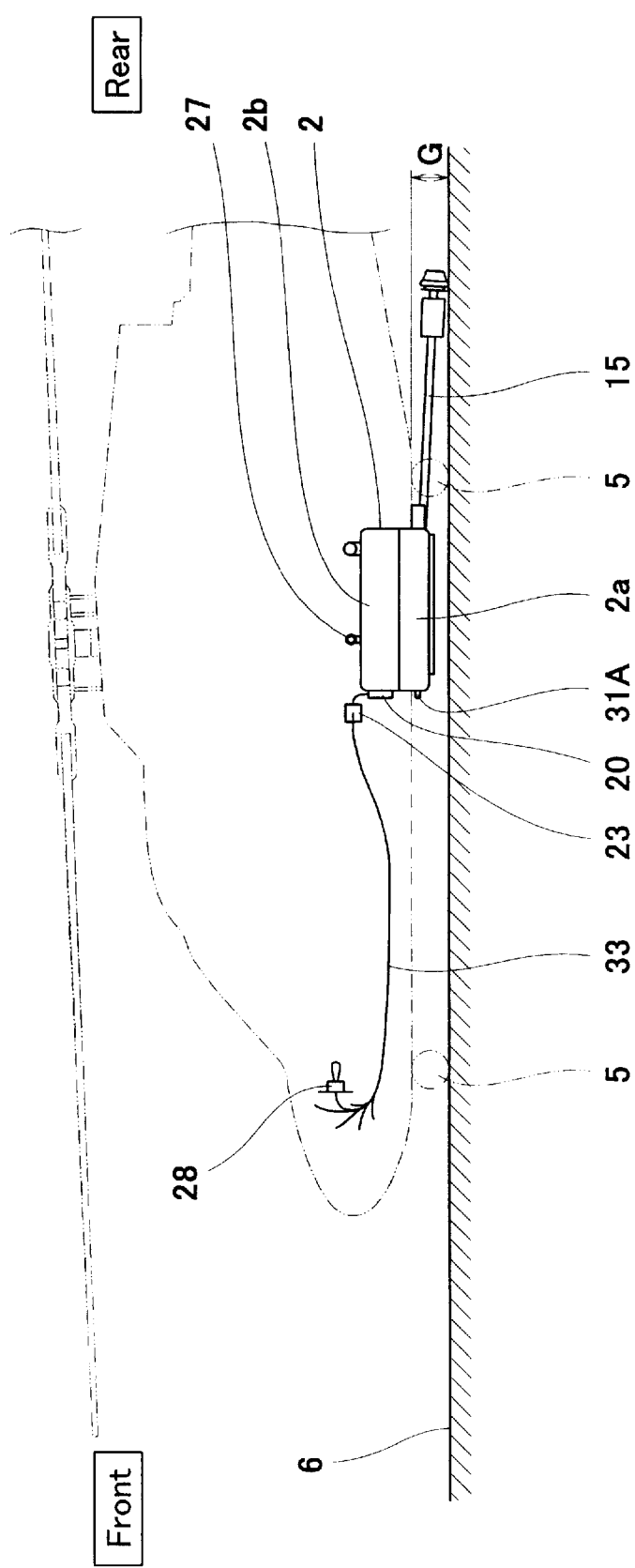
FIG. 2 is a left side view showing the schematic structure of the liquid dropping apparatus for a helicopter according to the embodiment of the present invention.
Figure 3:
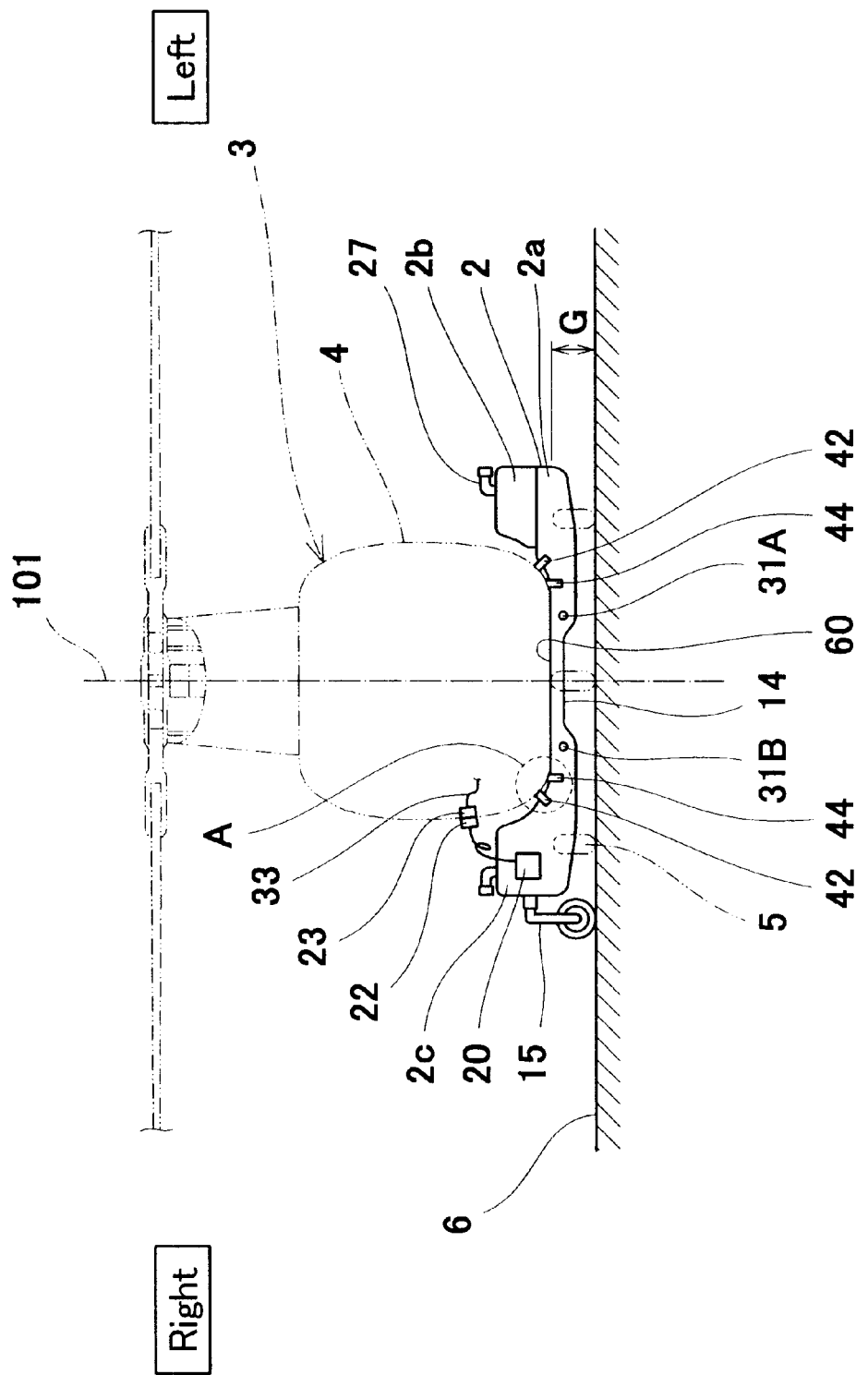
FIG. 3 is a front view showing the schematic structure of the liquid dropping apparatus for a helicopter according to the embodiment of the present invention.

FIG. 1 is a plan view showing the schematic structure of a liquid dropping apparatus for a helicopter according to an embodiment of the present invention, FIG. 2 is a left side view showing the same structure, and FIG. 3 is a front view showing the same structure. In this specification, the direction of the liquid dropping apparatus for a helicopter is represented by setting, as a reference, the direction of the advance of the helicopter as shown in FIGS. 1 to 3.

In FIGS. 1 to 3, a liquid dropping apparatus for a helicopter (which will be hereinafter referred to as a liquid dropping apparatus) 1 mainly comprises a tank 2, dropping doors 8A and 8B, and door opening and closing means (13A, 13B, 31A, 31B and the like). In the present embodiment, the tank 2 of the liquid dropping apparatus 1 serves to put water for fire fighting therein and a helicopter 3 to which the tank 2 is to be attached is used for disaster prevention. Accordingly, the helicopter 3 is used for many purposes such as emergency in addition to fire fighting.

In the tank 2, a pair of convex portions 2b and 2c are formed to be extended along right and left ends over the upper surface of a flat and rectangular parallelepiped base portion 2a and a concave portion 14 is formed to be extended in a longitudinal direction in the central part of the lower surface of the base portion 2a. Consequently, the tank 2 is formed to have a wide and substantially "U" shape as seen from a front part. In order to use the helicopter 3 for many purposes, the tank 2 can be attached to and removed from a body 4 of the helicopter 3 as will be described below. The tank 2 is almost transversely symmetrical with a vertical central plane 101. Moreover, the tank 2 is constituted to be attached to the helicopter 3 such that the central plane 101 is substantially coincident with the central plane of the helicopter 3. The reason is that the stability of the helicopter 3 can be prevented from being damaged due to the attachment of the tank 2 in a transverse imbalanced state.

A concave portion 14 is formed such that the wall portion of the lower surface of the base portion 2a in the tank 2 is concaved upward, has a substantially trapezoidal section, and is provided over the whole length in the longitudinal direction of the base portion 2a. The concave portion 14 is provided with a pair of liquid discharge ports 7A and 7B and the dropping doors 8A and 8B corresponding thereto. The torque shafts 13A and 13B for opening and closing the dropping doors 8A and 8B are provided to penetrate through the base portion 2a in the longitudinal direction and the driving sources 31A and 31B for rotating the torque shafts 13A and 13B are provided on the front surface of the base portion 2a.

In the present embodiment, the driving sources 31A and 31B are constituted by a well-known hydraulic rotary actuator. The rotating operation of the rotary actuator is controlled by opening and closing a switching valve in response to an electric control signal.

A pair of convex portions 2b and 2c are formed to bulge the wall portion of the upper surface of the base portion 2a in the tank 2 upward. Moreover, a pair of convex portions 2b and 2c are provided to form a concave portion 60 capable of accommodating the lower part of the body 4 of the helicopter 3 through the inner side surfaces of the convex portions 2b and 2c and the upper surface of the base portion 2a. Each of the upper surfaces of the convex portions 2b and 2c is provided with air supply and exhaust ports 26 and ground water supply ports 27. The air supply and exhaust port 26 is provided to discharge the air in the tank 2 when supplying water for fire fighting to the tank 2 and to suck the outside air into the tank 2 when dropping the water for fire fighting in the tank 2. A self-water supply device 15 is pivotably attached to the front part of the outside surface of the convex portion 2c on the right side (which will be hereinafter referred to as a starboard convex portion). Moreover, a wiring terminal 20 is provided on the front surface of the starboard convex portion 2c. Electric wirings (not shown), for example, a control signal line and a power feeding line to the motor-driven water supply pump of the self-water supply device 15 and the driving sources 31A and 31B are connected to the wiring terminal 20.

An electric wiring led from the wiring terminal 20 is connected to a cabin wiring 33 through an electric connector 22 and a body side output plug 23 which are provided on the outer and inner surfaces of the body of the helicopter 3 respectively. The electric connector 22 is constituted removably from the body side output plug 23. The control signal line in the cabin wiring 33 which is connected to the driving sources 31A and 31B is connected to a dropping switch 28 provided in the pilot compartment of a cabin. The reference numeral 42 denotes a rocking prevention fixture and the reference numeral 44 denotes a tank side fixture. Moreover, the reference numeral 5 denotes a wheel of the helicopter, the reference numeral 6 denotes a ground and G denotes a ground clearance.

Next, the structure of each portion will be described in detail.

Figure 4:
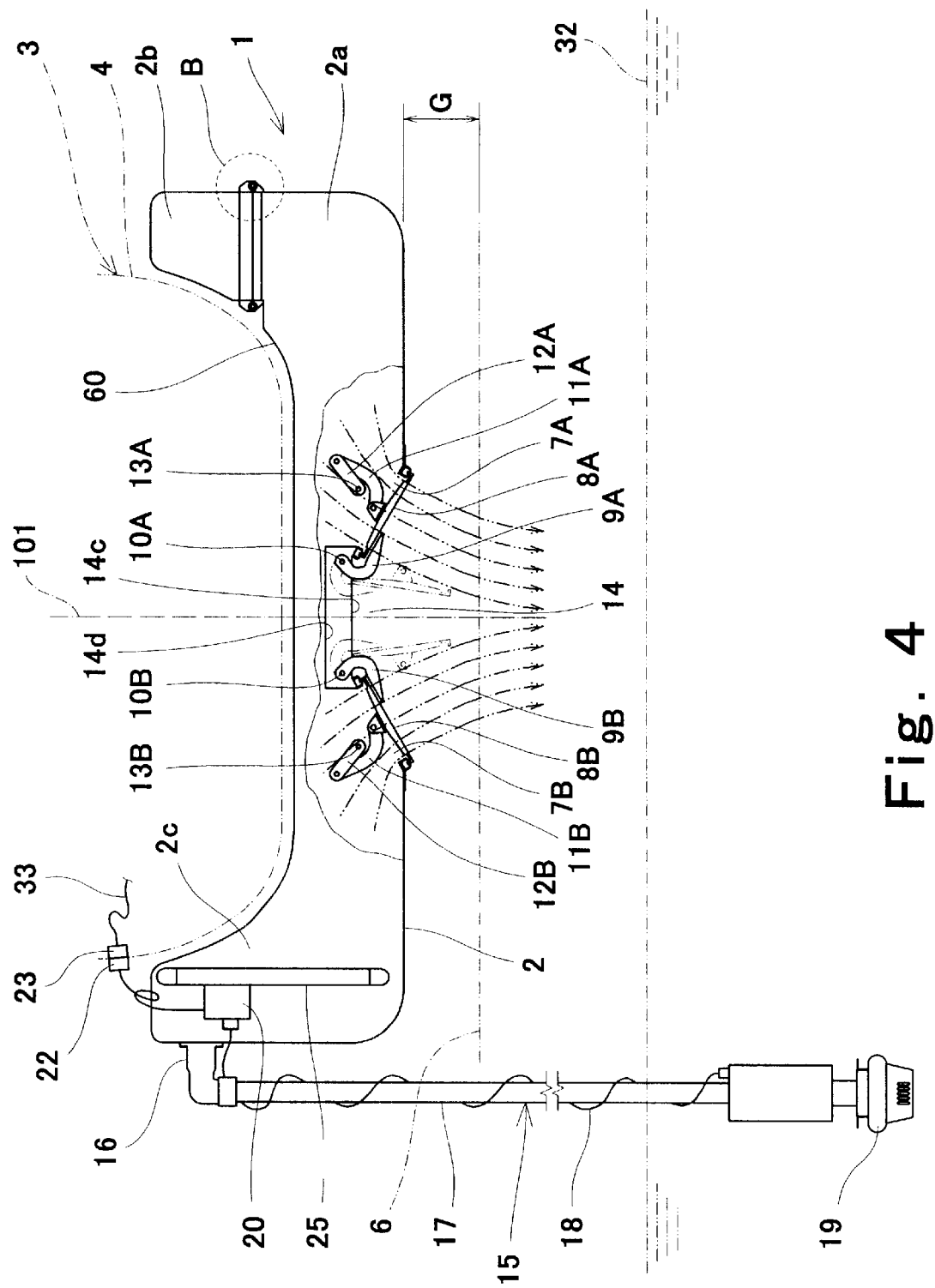
FIG. 4 is a partial sectional view showing the detailed structure of a tank and a self-water supply device in the liquid dropping apparatus in FIG. 1.
Figure 5:
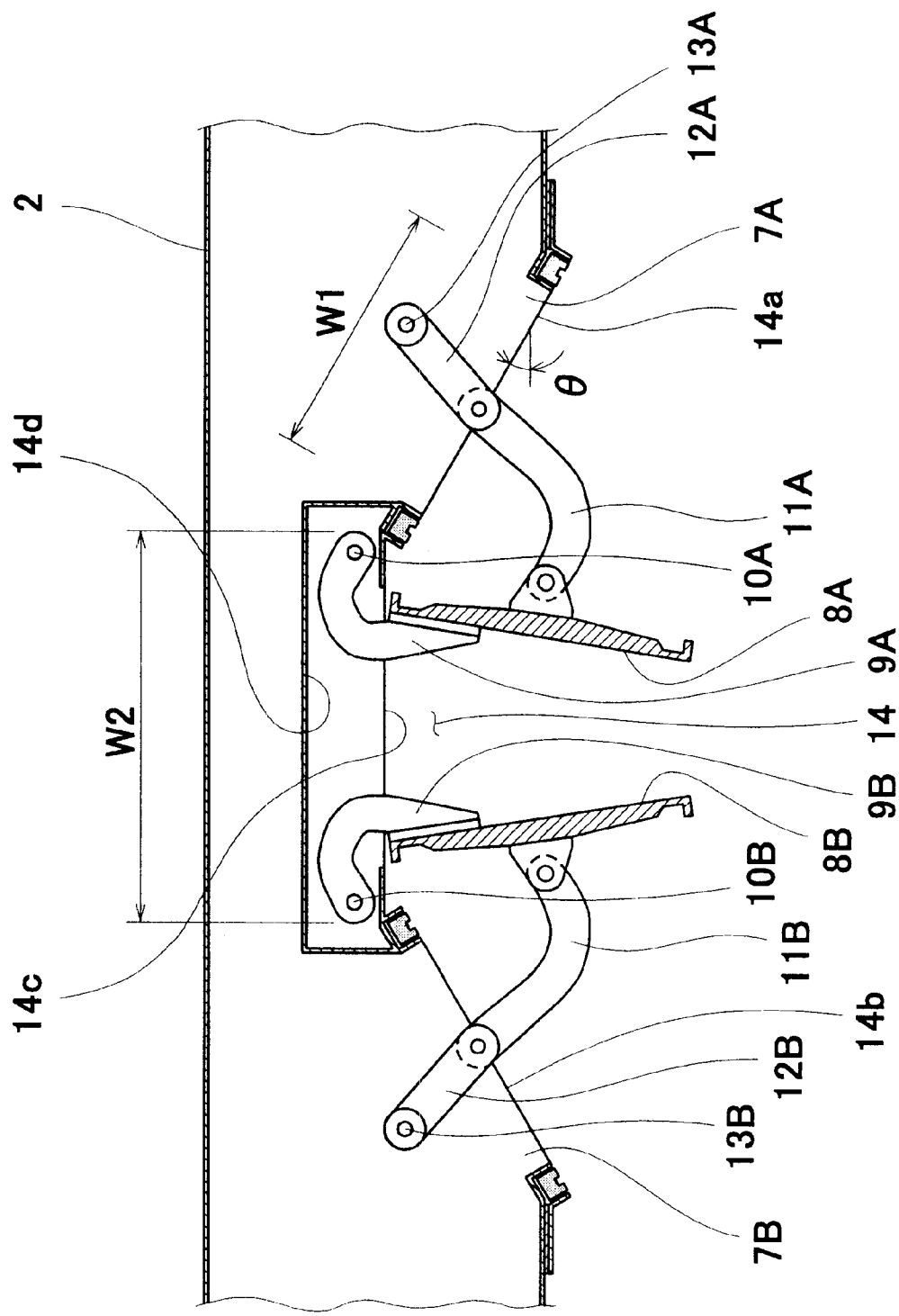
FIG. 5 is a sectional view showing the detailed structure of a dropping door opening and closing mechanism in the liquid dropping apparatus in FIG. 1.

FIG. 4 is a partial sectional view showing the detailed structures of the tank and the self-water supply device and FIG. 5 is a sectional view showing the detailed structure of the dropping door opening and closing mechanism.

In FIGS. 4 and 5, the concave portion 14 of the tank 2 is formed to have a substantially trapezoidal section. More specifically, the concave portion 14 has left and right side surfaces 14a and 14b inclined inward at an inclination θ and a horizontal bottom surface 14c. It is desirable that the inclination θ formed by the left and right side surfaces 14a and 14b should be set to approximately 30 degrees and a width W1 of each of the left and right side surfaces 14a and 14b should be substantially equal to a width W2 of the bottom surface 14c. On this condition, the water for fire fighting in the tank 2 can be rapidly dropped as will be described below. A pair of liquid discharge ports 7A and 7B are opened over almost the whole right and left side surfaces 14a and 14b (see FIG. 1). The liquid discharge ports 7A and 7B are provided with a pair of dropping doors 8A and 8B for opening and closing them. The outer surface of the dropping door 8A on the port side (hereinafter referred to as a port dropping door) is held by a hinge 9A, and the hinge 9A is fixed to the bottom surface 14c of the concave portion 14. Accurately, a concave portion 14d for fixing the base portions of hinges 9A and 9B is formed on the bottom surface 14c of the concave portion 14 and the hinge 9A is attached to the inner surface of the concave portion 14d such that a fulcrum 10A is positioned above the upper end of the liquid discharge port 7A on the port side (hereinafter referred to as a port liquid discharge port).

Moreover, one of the ends of a link 11A is connected to the inner surface of the port dropping door 8A and the other end of the link 11A is connected to the torque shaft 13A through a bell crank 12A. On the other hand, the outer surface of the dropping door 8B on the starboard side (hereinafter referred to as a starboard dropping door) is held by the hinge 9B, and the hinge 9B is attached to the inner surface of the concave portion 14d such that the fulcrum 10B is positioned above the upper end of the liquid discharge port 7B on the starboard side (hereinafter referred to as a starboard liquid discharge port). Moreover, one of the ends of the link 11B is connected to the inner surface of the starboard dropping door 8B and the other end of the link 11B is connected to the torque shaft 13B through a bell crank 12B. Consequently, when the torque shaft 13 is rotated clockwise in a state in which the port dropping door 7A shown in FIG. 4 is closed, the bell link 12A and the link 11A are extended to push the port dropping door 8A. Consequently, the port dropping door 8A pivotally swings rightwards and downwards around the fulcrum 10A of the hinge 9A, that is, a side thereof closer to the bottom surface 14c of the concave portion and is thereby opened as shown in FIG. 5. When the torque shaft 13A is rotated counterclockwise in this state, the bell link 12A and the link 11A retreat to pull the port dropping door 8A so that the port dropping door 8A pivotally swings leftwards and upwards and is thereby closed. On the other hand, the starboard dropping door 8B is operated transversely symmetrically with the port dropping door 8A to carry out opening and closing operations corresponding to rotation in the counterclockwise and clockwise directions of the torque shaft 13B. The driving sources 31A and 31B (see FIG. 1) are constituted such that mutual operation timings are coincident with each other in order to open and close the port and starboard dropping doors 8A and 8B in the same timing.

Next, the self-water supply device 15 will be described. The self-water supply device 15 has a water supply hose 17, a rotation joint 16 which is connected to the base end of the water supply hose 17 and is rotatably and removably attached to the front part of the outer side surface of the starboard convex portion 2c in the tank 2, and a motor-driven water supply pump 12 connected to the tip of the water supply hose 17.

The reference numeral 18 denotes an electric wiring to the motor-driven water supply pump 12. The electric wiring 18 is connected to a self-water supply switch (not shown) provided in a pilot compartment through a wiring terminal 20, an electric connector 22, a cabin side output plug 23 and a cabin wiring 33. A sight glass 25 to display a liquid level in the tank 2 is provided on the right end of the front surface of the tank 2.

Figure 6:
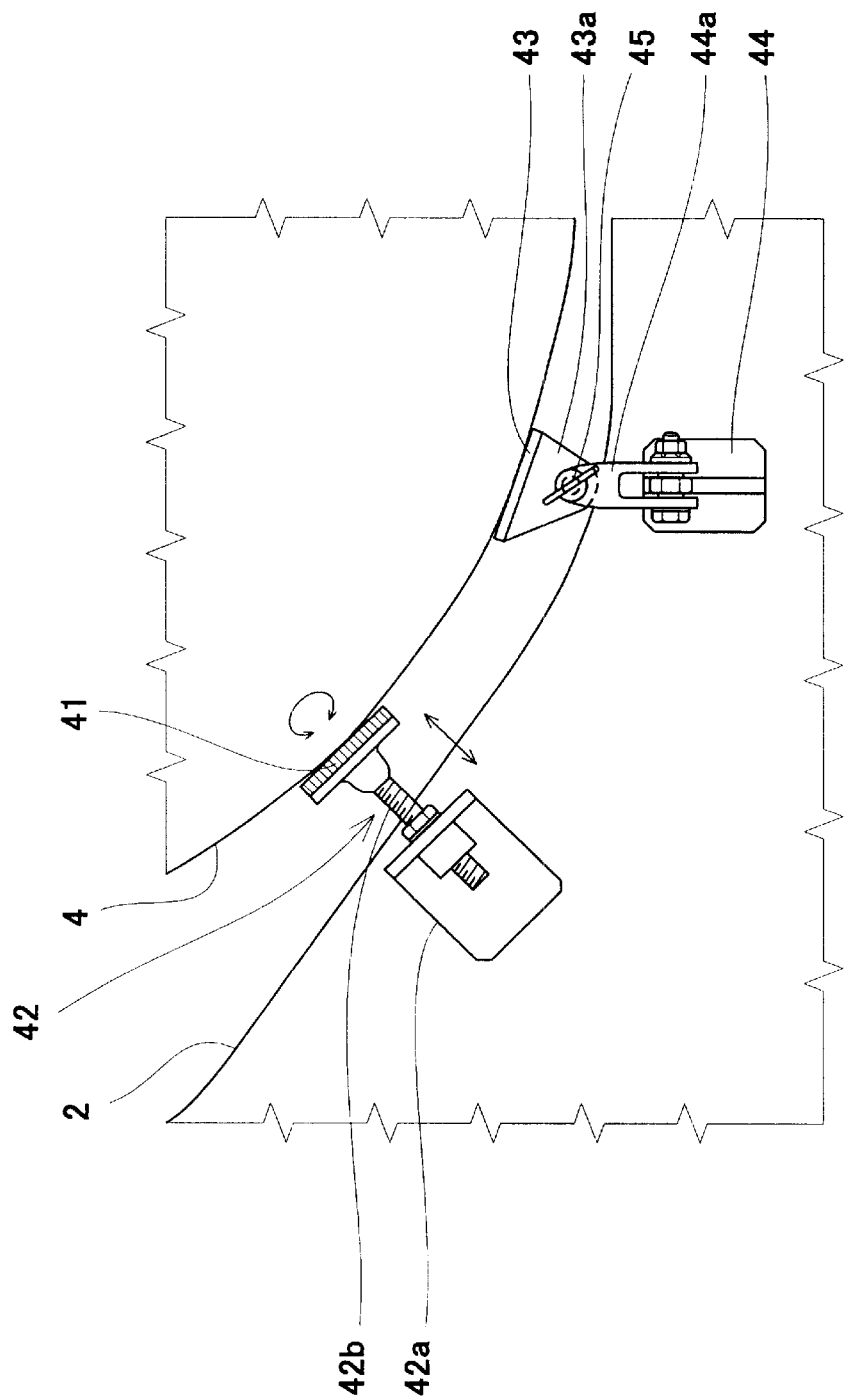
FIG. 6 is a detailed view showing an A portion in FIG. 3 illustrating a structure in which a tank is attached to and removed from a helicopter body.

Next, description will be given to a structure in which the tank 2 is attached to and removed from the helicopter body. FIG. 6 is a detailed view showing an A portion in FIG. 3 illustrating the structure in which the tank is attached to and removed from the helicopter body.

As shown in FIGS. 3 and 6, a tank side fixture 44 including a plate-shaped coupling portion 44a having a pin insertion hole is provided in a plurality of portions (two portions in the present embodiment) on the upper end of the front and rear surfaces (not shown) of the base portion 2a of the tank 2. Moreover, a helicopter side fixture 43 including a plate-shaped coupling portion 43a having a pin insertion hole is provided in a position corresponding to the tank side fixture 44 on the lower surface of the body 4 of the helicopter 3. The coupling portion 44a of the tank side fixture 44 and the coupling portion 43a of the helicopter side fixture 43 are constituted such that both pin insertion holes are adapted to each other when the tank 2 has a predetermined positional relationship with the body 4 of the helicopter 3. In the state of the adaptation, the coupling pin 45 is inserted into the pin insertion hole, thereby the coupling portion 44a of the tank side fixture 44 and the coupling portion 43a of the helicopter side fixture 43 are coupled to each other. Consequently, the tank 2 is attached to the body 4 of the helicopter 3. To the contrary, when the coupling pin 45 is pulled out, the tank 2 is removed from the body 4 of the helicopter 3.

Moreover, a pair of rocking prevention fixtures 42 are provided in a position on the outside of the portion where the tank side fixture 44 is provided on the upper ends of the front and rear surfaces (not shown) of the base portion 2a. The rocking prevention fixture 42 is constituted by a fixed portion 42a and a movable portion 42b which is screwed into the screw hole of the fixed portion 42 and moves forward and backward in the axial direction of the screw hole by rotation. The movable portion 42 is provided to move forward and backward in a substantially normal direction on the upper surface of the base portion 2a. A pad 41 is provided on the tip of the movable portion 42b. The position of the movable portion 42b is regulated such that the pad 41 abuts on the body 4 in a state in which the tank 2 is attached to the body 4 of the helicopter 3. Consequently, the tank 2 is restrained in a lateral direction by means of the rocking prevention fixtures 42. As a result, the movement of the tank 2 in the lateral direction can be prevented.

Next, description will be given to the joining structure of the base portion 2a of the tank 2 and the port convex portion 2b.

Figure 7:
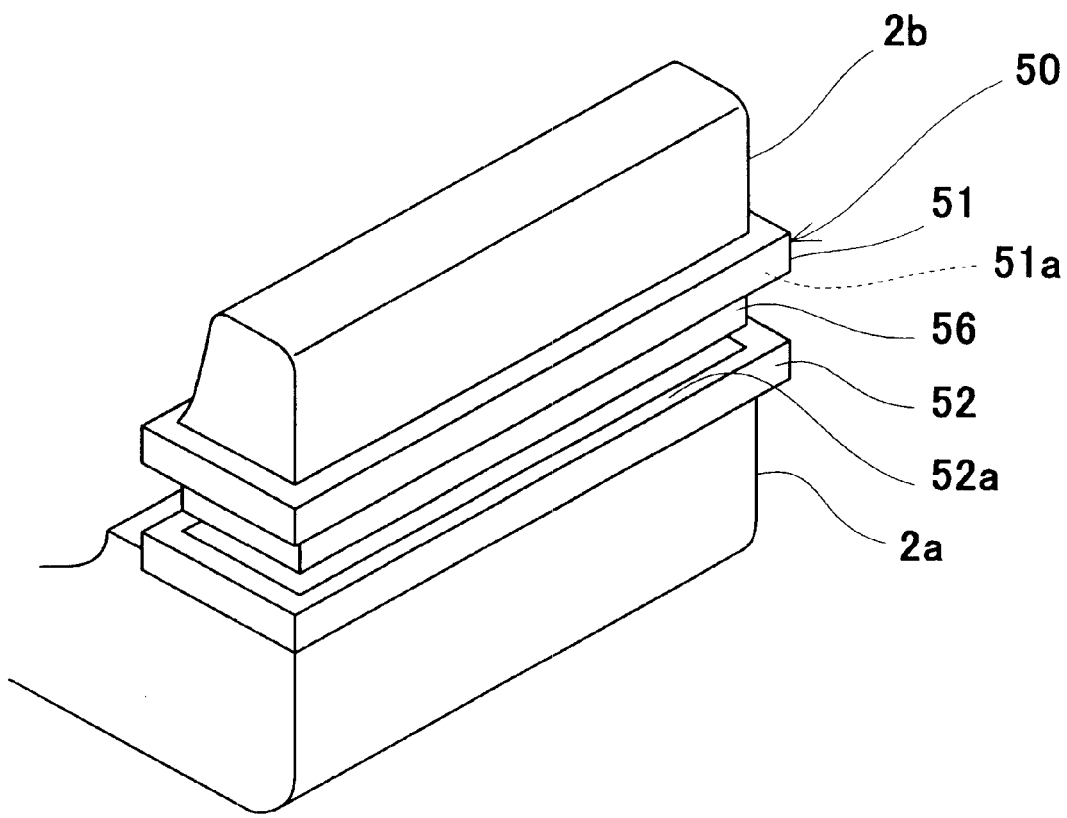
FIG. 7 is a perspective view showing the joining structure of the base portion of the tank and a port convex portion.
Figure 8A:
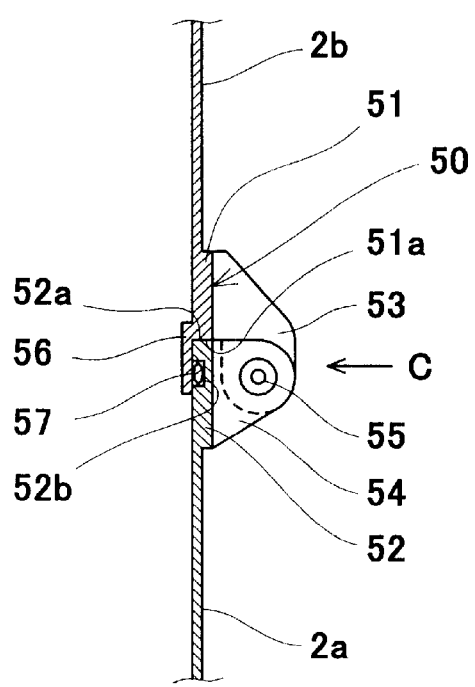
FIGS. 8A, 8B are views showing the joining structure of the base portion of the tank and the port convex portion, FIG. 8A being a detailed view showing a B portion in FIG. 4 and FIG. 8B being a view seen in the direction of an arrow C in FIG. 8A.
Figure 8B:
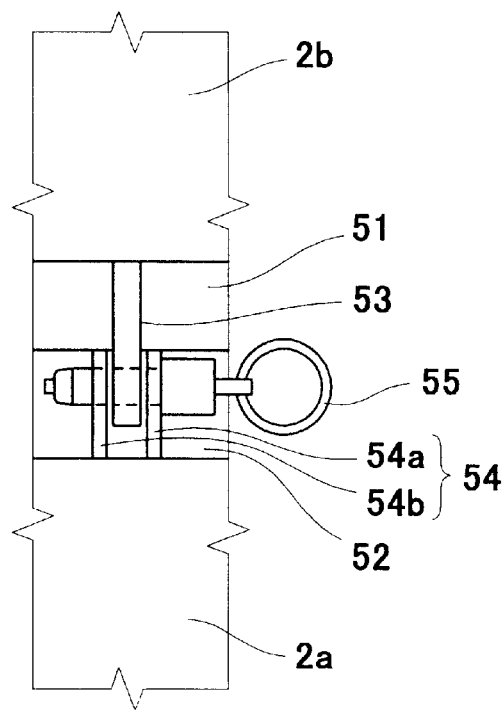

FIG. 7 is a perspective view showing the joining structure of the base portion 2a of the tank 2 and the port convex portion 2b and FIGS. 8A, 8B are views showing the joining structure of the base portion 2a of the tank 2 and the port convex portion 2b, FIG. 8A being a detailed view showing a B portion in FIG. 4 and FIG. 8B being a view seen in the direction of an arrow C in FIG. 8A. In FIG. 7, members other than each of the bodies of the base portion 2a and the port convex portion 2b are omitted.

As shown in FIGS. 7, 8A, and 8B, the tank 2 is constituted such that the port convex portion 2b is formed separately from the base portion 2a and is joined to the base portion 2a to form the integral tank 2. A joining portion 52 of the wall portion of the base portion 2a is formed in a thick portion which is thickened on the outer peripheral surface side and an upper end face thereof constitutes a joining surface 52a to the wall portion of the port convex portion 2b.

The joining surface 52a is formed like a rectangular ring. An O ring groove 52b is formed in the tip portion of the inner peripheral surface of the joining portion 52 and an O ring 57 is provided in the O ring groove 52b.

The joining portion 50 of the wall portion of the port convex portion 2b includes a thick portion 51 taking a shape corresponding to the joining portion 52 of the base portion 2a and having a joining surface 51a to be adapted to the joining surface 52a of the joining portion 52, and a rectangular and short cylindrical inserting portion 56 formed to be extended downward below the lower end of the inner peripheral surface of the thick portion 51. The outer peripheral surface of the inserting portion 56 is formed to be fitted in the inner peripheral surface of the joining portion 52 of the base portion 2a. Consequently, when the inserting portion 56 of the port convex portion 2b is inserted in the joining portion 52 of the base portion 2a, the joining surface 51a of the port convex portion 2b abuts on the joining surface 52a of the base portion 2a so that the port convex portion 2b is positioned in a downward direction with respect to the base portion 2a and the outer peripheral surface of the inserting portion 56 of the port convex portion 2b is fitted in the inner peripheral surface of the joining portion 52 of the base portion 2a so that the port convex portion 2b is positioned in a lateral direction with respect to the base portion 2a. Then, the inside of the tank 2 in the joining portion is sealed from the outside through the O ring 57.

As shown in FIGS. 4, 8A, and 8B, furthermore, a plate-shaped convex portion side fixture 53 having a pin insertion hole is provided in a plurality of portions (only two portions in FIG. 4) on the outer peripheral surface of the joining portion 50 of the port convex portion 2b in the tank 2. Moreover, a base portion side fixture 54 including a pair of plate-shaped coupling pieces 54a and 54b having pin insertion holes is provided in a position corresponding to the convex portion side fixture 53 on the outer peripheral surface of the joining portion 52 of the base portion 2a in the tank 2. The convex side fixture 53 and the base portion side fixture 54 are constituted such that both pin insertion holes are adapted to each other when the port convex portion 2b is joined to the base portion 2a. In the state of the adaptation, the coupling pin 55 is inserted into the pin insertion hole so that both of the fixtures 53 and 54 are coupled to each other. Consequently, the port convex portion 2b is fixed to the base portion 2a. To the contrary, when the coupling pin 55 is pulled out, thereby the port convex portion 2b can be removed from the base portion 2a.

Next, description will be given to a method of using the liquid dropping apparatus for a helicopter having the above-mentioned structure and an operation thereof.

In FIGS. 1 to 8B, it is assumed that the helicopter 3 is present on the ground. In this state, the tank 2 is mounted on a moving truck. At this time, the port convex portion 2b of the tank 2 is removed.

Then, the tank 2 is pushed from the right toward the lower side of the body 4 of the helicopter 3 together with the moving truck.

Thereafter, the position of the tank 2 is adapted to that of the body 4 of the helicopter 3 and the coupling pin 45 is inserted into the coupling holes of the tank side fixture 44 and the helicopter side fixture 43, thereby coupling both of the fixtures 44 and 43.

Subsequently, the movable portion 42b of the rocking prevention fixture 42 is rotated to cause the pad 41 to abut on the body 4 of the helicopter 3. Thus, the tank 2 is restrained in the lateral direction. Moreover, the inserting portion 56 of the joining portion 50 of the port convex portion 2b in the tank 2 is inserted into the joining portion 52 of the base portion 2a to join the port convex portion 2b to the base portion 2a and the coupling pin 55 is inserted into the coupling holes of the convex portion side fixture 53 and the base portion side fixture 54 to couple both of the fixtures 53 and 54 to each other. Consequently, the port convex portion 2b is attached to the base portion 2a. In the present embodiment, thus, the port convex portion 2b is attachable to and removable from the base portion 2a. Therefore, although the tank 2 has the convex portions 2b and 2c, the tank 2 can be easily attached to the lower surface of the body 4 of the helicopter 3.

Next, the rotating joint 16 of the self-water supply device 15 is attached to the side surface of the tank 2. Thus, the self-water supply device 15 is attached to the tank 2. Furthermore, the electric connector 22 is inserted into the cabin side output plug 23 of the body 4 of the helicopter 3 and is thus connected thereto.

As described above, the tank 2 is attached to the body 4 of the helicopter 3.

Then, the helicopter 3 is inspected before a flight. In that case, when the dropping switch 28 in the pilot compartment is turned ON, the torque shafts 13A and 13B are rotated clockwise and counterclockwise by means of the driving sources 31A and 31B respectively. The bell links 12A and 12B and the links 11A and 11B are interlocked with the rotation respectively so that the port and starboard dropping doors 8A and 8B pivotally swing downward to right and left respectively. Consequently, the port and starboard dropping doors 8A and 8B are opened. When the dropping switch 28 is turned OFF, the torque shafts 13A and 13B are rotated in reverse directions to the above-mentioned directions by means of the driving sources 31A and 31B respectively. Consequently, the port and starboard dropping doors 8A and 8B are closed. In the present embodiment, the pivoting fulcrums 10A and 10B of the dropping doors 8A and 8B are raised by the depth of the concave portion 14. Therefore, it is possible to open and close the door of a swing type so as not to interfere with the ground in spite of a smaller ground clearance corresponding to a rise in the fulcrums 10A and 10B. Moreover, the door of the swing type has a simple structure. For this reason, it is possible to prevent an increase in a weight and a deterioration in the reliability of the door opening and closing mechanism. Furthermore, the operation of the dropping doors 8A and 8B can be confirmed before performing a duty. Therefore, it is possible to prevent a duty achievement rate from being reduced. Moreover, when returning from the duty, the dropping doors 8A and 8B can be opened to discharge the water from the tank 2. Therefore, extra ground equipment is not required.

After the operation of the dropping doors 8A and 8B is confirmed, a fire-fighting water supply wagon or the like is connected to the ground water supply port 28 of the tank 2 to supply the water for fire fighting to the tank 2.

Figure 9:
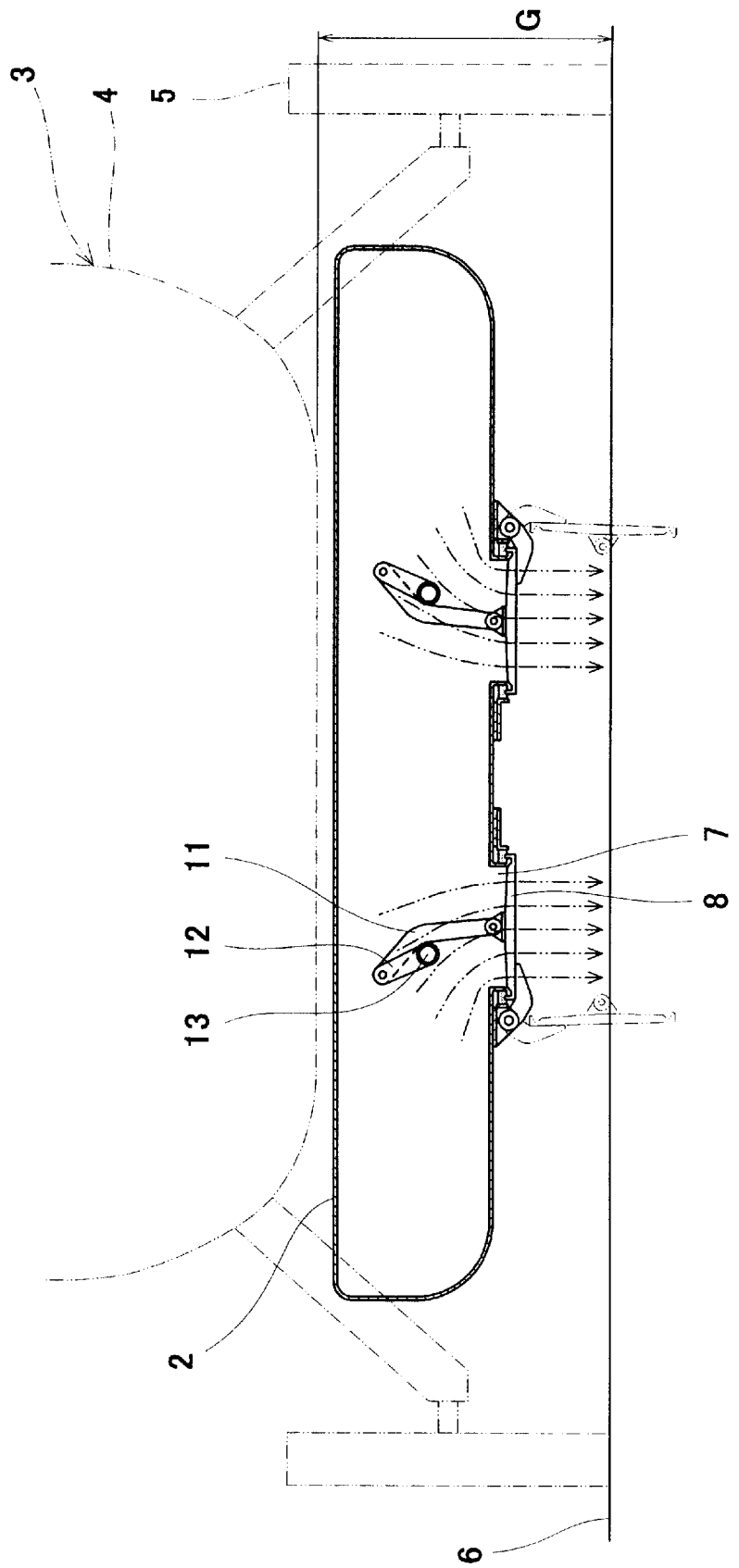
FIG. 9 is a sectional view typically showing the structure of a liquid dropping apparatus for a helicopter according to a first conventional example.
Figure 10:
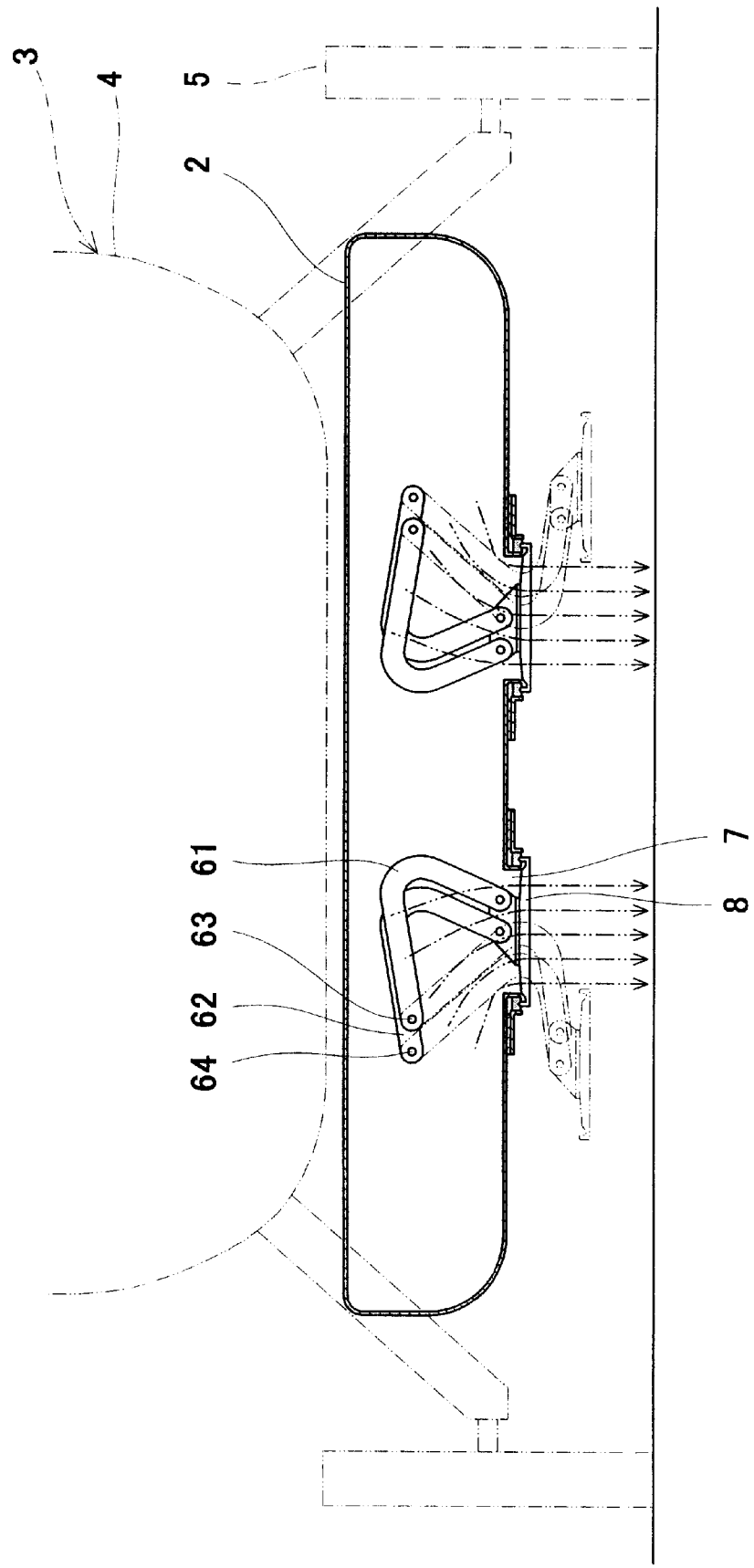
FIG. 10 is a sectional view typically showing the liquid dropping apparatus for a helicopter according to a second conventional example.

Then, when the helicopter 3 is caused to take off and reaches the skies of the fire scene, the dropping switch in the pilot compartment is turned ON. As shown in FIG. 4, consequently, the port and starboard dropping doors 8A and 8B are opened so that water for fire fighting in the tank 2 is discharged from the port and starboard liquid discharge ports 7A and 7B. The water for fire fighting discharged from the two liquid discharge ports 7A and 7B falls and converges on one stream over the central plane 101 of the tank 2 and is dropped into a flaming portion or a target point. Therefore, the change of the dropped water for fire fighting into a mist can be reduced and the water for fire fighting can be dropped intensively, and a thickener is not required. Moreover, the water for fire fighting in the tank 2 is discharged from the two liquid discharge ports 7A and 7B obliquely downward. Therefore, the water for fire fighting in the tank 2 can be dropped rapidly. In the present embodiment, moreover, the port and starboard convex portions 2b and 2c are provided in the tank 2. Therefore, the water head of the water for fire fighting in the tank 2 is correspondingly increased. Consequently, the water for fire fighting in the tank 2 can be dropped more rapidly. These effects can be represented by specific numeric values. As described above, when the inclination θ formed by the left and right side surfaces 14a and 14b of the concave portion 14 in the tank 2 is 30 degrees and the width W1 of each of the side surfaces 14a and 14b is substantially equal to the width S2 of the bottom surface 14c of the concave portion 14 (see FIG. 5) as described above, it takes approximately 3.5 seconds to discharge the water for fire fighting which is filled in the tank 2. On the other hand, in the case in which the capacity of the tank and the opening area of the liquid discharge port are set to be equal to those of the present embodiment, the shape of the tank is flat and rectangular parallelepiped and the liquid discharge port is provided on the lower surface of the tank in the same manner as in the conventional example shown in FIGS. 9 and 10, it takes approximately 5 seconds to discharge the water for fire fighting which is filled in the tank. Thus, the present invention can produce remarkable effects on the time required for discharging the water for fire fighting in the tank. In the present embodiment, furthermore, the port and starboard convex portions 2b and 2c are provided in the tank 2. Therefore, it is possible to prevent the capacity of the tank 2 from being decreased due to the provision of the concave portion 14.

Moreover, the helicopter 3 can also carry out self-water supply. In this case, the helicopter 3 takes off without supplying the water to the tank 2 on the ground and then stops in the air in the skies of rivers and lakes. When the helicopter 3 is present on the ground, the self-water supply device 15 is turned obliquely rearward and downward to the helicopter 3 as shown in FIG. 1. When the helicopter 3 takes off, the self-water supply device 15 pivotally swings by a self-weight in the state of FIG. 1 and hangs downward as shown in FIG. 4. Therefore, the pilot pushes the motor-driven water supply pump 19 provided on the tip of the hanging self-water supply device 15 into water 32 and turns ON a self-water supply switch (not shown) which is provided in the pilot compartment. Consequently, the motor-driven water supply pump 19 is operated so that the water for fire fighting is supplied into the tank 2. The water for fire fighting which is supplied by itself is dropped in the same manner as described above.

While the liquid discharge ports 7A and 7B are provided over the whole side surfaces 14a and 14b of the concave portion 14 in the present embodiment, they may be provided on a part of the side surfaces 14a and 14b. In this case, the water for fire fighting which is discharge from the port and starboard liquid discharge ports falls and converges on one stream. Therefore, it is necessary to provide the port and starboard liquid discharge ports in the positions of the left and right side surfaces 14a and 14b which are opposed to each other as seen from above and are placed on the level with each other.

While the case in which the present invention is applied to the tank for putting the water for fire fighting therein has been described in the present embodiment, the present invention can be applied to any tank for putting a liquid therein in the same manner as described above. For example, it is also possible to use a tank for putting specific chemicals, that is, a neutralizing agent therein.

While the concave portion 14 is formed over the whole length of the tank 2 in the longitudinal direction in the present embodiment, it may be formed over a certain length in the middle in the longitudinal direction.

While one of the convex portions 2b and 2c of the tank is attachable to and removable from the base portion 2a in the present embodiment, both of them may be removable.

While the convex portions 2b and 2c are provided on the upper surface of the tank 2 in the present embodiment, they may be omitted. In this case, it is desirable that the width of the tank 2 in a transverse direction should be increased as much as possible in order to prevent the capacity of the tank from being decreased due to the provision of the concave portion 14.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A liquid dropping apparatus for a helicopter comprising:

a tank for containing a liquid and adapted for attachment below a helicopter;

a concave portion formed by concaving a wall portion of the tank; such that the concave portion is concave with respect to an outer external surface of the tank, wherein said concave portion extends inwardly towards the longitudinal axis of the helicopters;

a liquid discharge port opened on a side surface of the concave portion;

a door provided to pivotally swing around a side of the door at a location remote from an opening portion of the concave portion, thereby opening and closing the liquid discharge port; and a door opening and closing means for driving the door to open and close.

2. The liquid dropping apparatus for a helicopter according to claim 1, wherein the liquid discharge ports are opened in positions of side surfaces of the concave portion which are opposed to each other as seen from above and are placed on substantially the same level; and the door is provided in each of the liquid discharge ports.

3. The liquid dropping apparatus for a helicopter according to claim 2, wherein a portion of the side surface of the concave portion in which the liquid discharge port is opened is inclined inward in the concave portion.

4. The liquid dropping apparatus for a helicopter according to claim 3, wherein the concave portion is formed to extend in a direction in which a body of the helicopter extends when the tank is attached to the body and the liquid discharge ports are opened on both side surfaces in a direction in which the concave portion extends.

5. The liquid dropping apparatus for a helicopter according to claim 4, wherein the tank is formed almost symmetrically with a vertical plane extending in the direction in which the concave portion extends.

6. The liquid dropping apparatus for a helicopter according to claim 1, wherein a pair of convex portions are formed on an upper surface of the tank by bulging a stall portion and are provided such that the body of the helicopter is positioned between the convex portions when the tank is attached to the body.

7. The liquid dropping apparatus for a helicopter according to claim 5, wherein a pair of convex portions are formed on an upper surface of the tank by bulging a wall portion and are provided such that the body of the helicopter is positioned between the convex portions and is almost symmetrical with the vertical plane when the tank is attached to the body.

8. The liquid dropping apparatus for a helicopter according to claim 7, wherein a vertical section of the concave portion in the direction perpendicular to a direction in which the concave portion extends is formed to be substantially trapezoidal, the liquid discharge ports are opened over substantially whole both side surfaces in the direction in which the concave portion extends respectively, an inclination of the side surfaces to a horizontal plane is approximately 30 degrees and a width of each of the side surfaces is substantially equal to that of a bottom surface of the concave portion.

9. The liquid dropping apparatus for a helicopter according to claim 1, wherein the tank is removable from the body of the helicopter.

10. The liquid dropping apparatus for a helicopter according to claim 6, wherein the tank is removable from the body of the helicopter and at least one of the convex portions is removable from other portions of the tank.

11. A liquid dropping apparatus for a helicopter comprising:

a helicopter;

a tank for containing a liquid including a pair of convex portions formed on an upper surface thereof by bulging a wall portion of the tank, said tank attached below the helicopter such that the body of the helicopter is positioned between the convex portions, and wherein a lower surface of the tank has a concave portion formed by concaving a wall portion thereof, and said tank having a liquid discharge port opened on a side surface of the concave portion;

a door provided on a bottom surface of the concave portion of the tank to pivotally swing around a side thereof closer to the bottom surface of the concave portion, thereby freely opening and closing the liquid discharge port; and a door opening and closing means for driving the door to open and close.

12. A liquid dropping apparatus for a helicopter comprising:

a helicopter;

a tank for containing a liquid and adapted for attachment below the helicopter, said tank including a lower surface having concave portions formed by concaving wall portions and liquid discharge ports opened in portions of side surfaces of the concave portions which are opposed to each other as seen from above, said liquid discharge ports being disposed on substantially the same level;

a door provided on a bottom surface of each of the concave portions of the tank to pivotally swing around a side surface thereof closer to the bottom surface of the concave portion, thereby freely opening and closing the liquid discharge port, wherein a portion of each of the side surfaces of the concave portions in which liquid discharge ports are opened is inclined inward in the concave portion, wherein the concave portion is formed to extend in a direction in which a body of the helicopter extends when the tank is attached to the body and the liquid discharge ports are opened on both side surfaces in a direction in which the concave portion extends; wherein the tank is formed almost symmetrically with a vertical plane extending in the direction in which the concave portion extends;

wherein a pair of convex portions are formed on an upper surface of the tank by bulging a wall portion and are provided such that the body of the helicopter is positioned between the convex portions and is almost symmetrical with the vertical plane when the tank is attached to the body; and a door opening and closing means for driving the door to open and close.

13. The liquid dropping apparatus for a helicopter according to claim 12, wherein a vertical section of the concave portion in the direction perpendicular to a direction in which the concave portion extends is formed to be substantially trapezoidal, the liquid discharge ports are opened over substantially whole both side surfaces in the direction in which the concave portion extends respectively, an inclination of the side surfaces to a horizontal plane is approximately 30 degrees and a width of each of the side surfaces is substantially equal to that of a bottom surface of the concave portion.

14. The liquid dropping apparatus for a helicopter according to claim 11, wherein the tank is removable from the body of the helicopter.

15. A liquid dropping apparatus for a helicopter comprising:

a helicopter;

a tank for containing a liquid and adapted for attachment below the helicopter, said tank including a lower surface having a pair of convex portions formed on an upper surface of the tank by bulging a wall portion such that a body of the helicopter is positioned between the convex portions when the tank is attached to the body;

a concave portion formed by concaving a wall portion and a liquid discharge port opened on a side surface of the concave portion, wherein the tank is removable from the body of the helicopter and at least one of the convex portions is removable from other portions of the tank;

a door provided on a bottom surface of the concave portion of the tank to pivotally swing around a side thereof closer to the bottom surface of the concave portion, thereby freely opening and closing the liquid discharge port; and a door opening and closing means for driving the door to open and close.

* * * * *

UNITED STATES PATENT AND TRADEMARK OFFICE
CERTIFICATE OF CORRECTION

PATENT NO. : 6,578,796 B2
DATED : June 17, 2003
INVENTOR(S) : Iwao Maeda

It is certified that error appears in the above-identified patent and that said Letters Patent is hereby corrected as shown below:

Column 12,
Line 7, please change "axis of the helicopters;" to -- axis of the helicopter; --.
Line 39, please change "bulging a stall portion" to -- bulging a wall portion --.

Signed and Sealed this

Sixteenth Day of September, 2003

JAMES E. ROGAN
*Director of the United States Patent and Trademark Office*